US005732392A

United States Patent [19]

Mizuno et al.

[11] Patent Number: 5,732,392

[45] Date of Patent: Mar. 24, 1998

[54] METHOD FOR SPEECH DETECTION IN A HIGH-NOISE ENVIRONMENT

[75] Inventors: Osamu Mizuno, Yokohama; Satoshi Takahashi, Yokosuka; Shigeki Sagayama, Hoya, all of Japan

[73] Assignee: Nippon Telegraph and Telephone Corporation, Tokyo, Japan

[21] Appl. No.: 719,015

[22] Filed: Sep. 24, 1996

[30] Foreign Application Priority Data

Sep. 25, 1995 [JP] Japan .................................... 7-246418

[51] Int. Cl.$^{6}$ .................................................. G01L 3/00

[52] U.S. Cl. ........................... 704/233; 704/222; 704/226

[58] Field of Search .................................... 704/233, 222, 704/226, 214, 253

[56] References Cited

U.S. PATENT DOCUMENTS

| | | | |
|---|---|---|---|
| 3,712,959 | 1/1973 | Fariello | 704/233 |
| 4,282,403 | 8/1981 | Sakoe | 704/243 |
| 5,210,820 | 5/1993 | Kenyon | 704/231 |
| 5,220,629 | 6/1993 | Kosaka | 704/259 |
| 5,459,815 | 10/1995 | Aikawa | 704/254 |
| 5,579,435 | 11/1996 | Jansson | 704/233 |
| 5,596,680 | 1/1997 | Chow | 704/248 |
| 5,598,504 | 1/1997 | Miano | 704/222 |

*Primary Examiner*—Allen R. MacDonald
*Assistant Examiner*—Daniel Abebe
*Attorney, Agent, or Firm*—Pollock, Vande Sande & Priddy

[57] ABSTRACT

In method for detecting a speech period in a high-noise environment, the variation in the spectrum of an input signal per unit time is calculated over an analysis frame period, and when the frequency of spectrum variation falls in a predetermined range, the input signal of that frame is decided to be a speech signal.

17 Claims, 5 Drawing Sheets

A
SPEECH SIG WAVEFORM
B
DYNAMIC MEASURE
/keikai/
/sasuga/

A
INPUT SIG WAVEFORM
B
CORRECT SPEECH PERIOD
C
DETECTING PERIOD
D
VARIATION IN DYNAMIC
SPEECH PERIOD
NON-SPEECH PERIOD

| | DETECT RATE [%] | CORRECT RATE [%] |
|---|---|---|
| DYNAMIC MEASURE ONLY | 84.4 | 34.6 |
| DYNAMIC MEASURE & VQ DISTORTION | 83.3 | 80.0 |

METHOD FOR SPEECH DETECTION IN A HIGH-NOISE ENVIRONMENT

BACKGROUND OF THE INVENTION

The present invention relates to a speech endpoint detecting method and, more particularly, to a method for detecting a speech period from a speech-bearing signal in a high-noise environment.

Speech recognition technology is now in wide use. To recognize speech, it is necessary to detect a speech period to be recognized in the input signal. A description will be given of a conventional technique for detecting the speech period on the basis of amplitude that is the power of speech. The power herein mentioned is the square-sum of the input signal per unit time. Speech usually contains a pitch frequency component, whose power is particularly large in the vowel period. On the assumption that a frame in the input signal over which the power of the input signal exceeds a certain threshold value is a frame of vowel, the conventional scheme detects, as the speech period, the vowel frame together with several preceding and following frames. With this method, however, a problem arises that signals of large power, which last for about the same period of time as the duration of a word, are all erroneously detected as speech. That is, sounds of large power, such as the sounds of a telephone bell and a closing door, are detected as speech. Another problem of this method is that the more the power of background noise increases, the harder it is to detect the power period of speech. Hence, in voice control of an instrument in a car, for instance, there is a possibility of the instrument becoming uncontrollable or malfunctioning due to a recognition error.

Another prior art method is to detect the speech period on the basis of a pitch frequency which is the fundamental frequency of speech. This method utilizes that the pitch frequency of a vowel stationary part falls in the range of from 50 to 500 Hz or so. The pitch frequency of the input signal is examined, then the frame in which the pitch frequency stays in the above-mentioned frequency range is assumed to be the frame of vowel, and the frame and several preceding and following frames are detected as a speech period. With this method, however, a signal with the pitch frequency in the frequency range is erroneously detected as speech even if it is noise. In an environment where music containing a high pitch component, in general, is floating in the background, the speech period is very likely to be erroneously detected owing to the pitch component of the musical sound. Further, since the pitch frequency detecting method utilizes the fact that the waveform of human speech assumes high correlation every pitch, the superimposition of noise on speech make it impossible to obtain a high correlation value and hence detect the correct pitch frequency, resulting in failure to detect speech.

In Japanese Patent Application Laid-Open No. 200300/85 there is proposed a method which is aimed at increasing the accuracy of detecting start and end points of the speech period. This method defines the start and end points of the speech period as the points in time when the signal spectrum undergoes large variations in the vicinities of the start and end points of a period in which the power of the input speech signal exceeds a threshold value. Since this method is predicated on the detection of the power level of the input signal that exceeds the threshold value, there is a very strong possibility of a detection error arising when the speech signal level is low or noise level is high.

With the above-described conventional method for detecting the speech period based on the power of speech, when the power of background noise is large, it cannot be distinguished from the power of speech and the noise is erroneously detected as speech. On the other hand, according to the speech period detecting method based on the pitch frequency, when noise is superimposed on speech, there is a case where a stable pitch frequency cannot be obtained and hence no speech can be detected. Additionally, in U.S. Pat. No. 5,365,592 there is disclosed a method which obtains a cepstrum pitch by an FFT analysis of the input signal and, based on the cepstrum pitch, determines at every point in time whether the input signal is speech or not. This method is also prone to decision errors due to noise.

SUMMARY OF THE INVENTION

It is therefore an object of the present invention to provide a signal processing method which permits stable detection of the speech period from the input signal even in a high-noise environment through utilization of information characteristic of speech.

According to the present invention, the signal processing method for detecting the speech period in the input signal, comprises the steps of:

(a) obtaining a spectral feature parameter by analyzing the spectrum of the input signal for each predetermined analysis window;

(b) calculating the amount of change in the spectral feature parameter of the input signal per unit time;

(c) calculating the frequency of variation in the amount of the spectral feature parameter over a predetermined analysis frame period longer than the unit time; and (d) making a check to see if the frequency of variation falls in a predetermined frequency range and; if so, deciding that the input signal of the analysis frame is a speech signal.

In the above signal processing method, the step of calculating the amount of change in the spectral feature parameter comprises a step of obtaining a time sequence of feature vectors representing the spectra of the input signal at respective points in time, and a step of calculating the dynamic measures through the use of the feature vectors at a plurality of points in time and calculating the variation in the spectrum from the norm of the dynamic measures.

In the above signal processing method, the frequency calculating step is a step of counting the number of peaks of the spectrum variation exceeding a predetermined threshold value and providing the resulting count value as the frequency.

Alternatively, the frequency calculating step includes a step of calculating the sum total of variations in the spectrum of the input signal over the analysis frame period longer than the unit time and the deciding step decides that the input signal of the analysis frame period is a speech signal when the value of sum total is within a predetermined range of values.

The above signal processing method further comprises a step of vector quantizing the input signal for each analysis window by referring to a vector code book composed of representative vectors of spectral feature parameters of speech prepared from speech data and calculating quantization distortion. When the quantization distortion is smaller than a predetermined value and the frequency of variation is within the predetermined frequency ranged, the deciding step (d) decides that the input signal in the analysis window represents the speech period.

The above signal processing method further comprises a step of obtaining the pitch frequency, amplitude value or correlation value of the input signal for each analysis window and deciding whether the input signal is a vowel. When the vowel is detected and the frequency of variation is in the predetermined frequency range, the deciding step (d) decides that the input signal in the analysis window is a speech signal. Alternatively, the deciding step (d) counts the number of zero crossings of the input signal and, based on the count value, decides whether the input signal is a consonant, and decides the speech period on the basis of the decision result and the frequency of variation.

According to the present invention; since attention is focused on the frequency of spectrum variation characteristic of a speech sound, even a noise of large power can be distinguished from speech if it does not undergo a spectrum change with the same frequency as does the speech. Accordingly, it is possible to determine if unknown input signals of large power, such as a steady-state noise and a gentle sound of music, are speech. Even if noise is superimposed on the speech signal, speech can be detected with high accuracy because the spectrum variation of the input signal can be detected accurately and stably. Further, a gentle singing voice and other signals relatively low in the frequency of spectrum variation can be eliminated or suppressed.

The above method is based solely on the frequency of spectrum variation of the input signal, but the speech period can be detected with higher accuracy by combining the frequency of spectrum variation with one or more pieces of information about the spectral feature parameter, the pitch frequency, the amplitude value and the number of zero crossings of the input signal which represent its spectrum envelope at each point in time.

DESCRIPTION OF THE PREFERRED EMBODIMENTS

Figure 1:
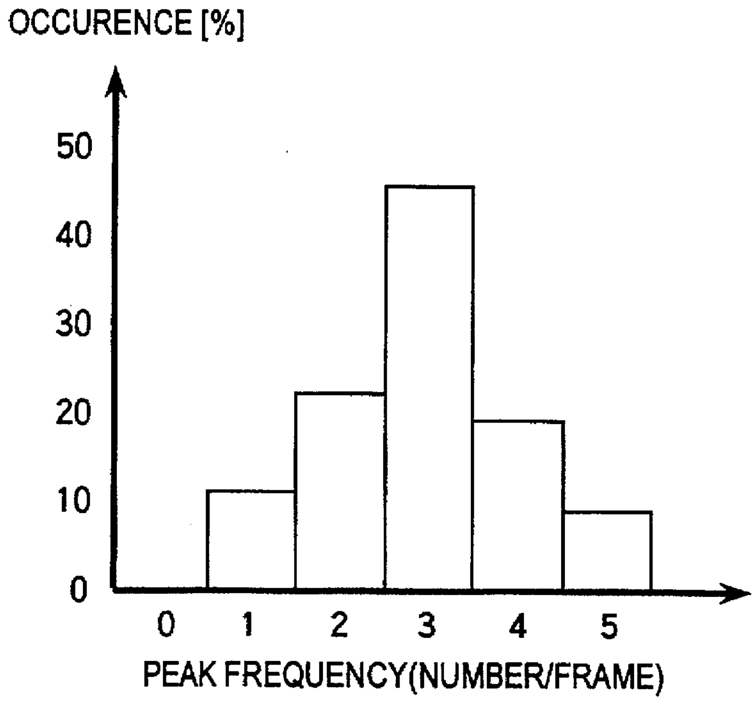
FIG. 1 is a graph showing the frequency of spectrum change of a speech signal on which the present invention os based.

In accordance with the present invention, a spectrum variation of the input signal is derived from a time sequence of its spectral feature parameters and the speech period to be detected is a period over which the spectrum of the input signal changes with about the same frequency as in the speech period.

The detection of a change in the spectrum of the input signal begins with calculating the feature vector of the spectrum at each point in time, followed by calculating the dynamic feature of the spectrum from feature vectors at a plurality of points in time and then by calculating the amount of change in the spectrum from the norm of the dynamic feature vector. The frequency or temporal pattern of spectrum variation in the speech period is precalculated and a period during which the input signal undergoes a spectrum change similar to the above is detected as the speech period. As the spectral feature parameter, it is possible to use spectral envelope information obtainable by an FFT spectrum analysis, cepstrum analysis, short-time autocorrelation analysis, or similar spectrum analysis. The spectral feature parameter is usually a sequence of plural values (corresponding to a sequence of spectrum frequencies), which will hereinafter be referred to as a feature vector. The dynamic feature may be the difference between time sequences of spectral feature parameters, a polynomial expansion coefficient or any other spectral feature parameters as long as they represent the spectrum variation. The frequency of spectrum variation is detected by a method capable of detecting the degree of spectrum change by counting the number of peaks of the spectrum variation over a certain frame time width or calculating the integral of the amount of change in the spectrum.

Of sounds, a speech sound is, in particular, a sequence of phonemes and each phoneme has a characteristic spectrum envelope. Accordingly, the spectrum changes largely at the boundary between phonemes. Moreover, the number of phonemes which are produced per unit time (the frequency of generation of phonemes) in such a sequence of phonemes does not differ with languages but is common to general languages. In terms of the spectrum variation the speech signal can be characterized as a signal whose spectrum varies with a period nearly equal to the phoneme length. This property is not found in other sounds (noises) in the natural world. Hence, by precalculating an acceptable range of spectrum variation in the speech period, it is possible to detect, as the speech period, a period in which the frequency of occurrence of the spectrum variation of the input signal is in the precalculated range.

As methods for analyzing the spectrum of the input signal, there have been known, for example, a method of directly frequency analyzing the input signal, a method of FFT (Fast Fourier Transform) analyzing the input signal and a method of LPC (Linear Predictive Coding) analyzing the input signal. The following is spectral parameter deriving equations by three representative speech spectrum analysis methods.

(a) Spectral parameter $\phi(m)$ by a short-time autocorrelation analysis:

$$\phi(m)=\frac{1}{N}\sum_{n=0}^{N-1-|m|}x(n)x(n+|m|) \qquad (1)$$

(b) Spectral parameter $S(\omega)$ by a short-time spectrum analysis:

$$S(\omega)=\frac{1}{2\pi N}\left|\sum_{n=0}^{N-1}x(n)\exp(-j\omega n)\right|^2 \qquad (2)$$

(c) Spectral parameter Cn by a cepstrum analysis:

$$Cn = \frac{1}{N} \sum_{k=0}^{N-1} \log|X(k)|\exp\{j2\pi kn/N\} \quad (3)$$

The spectral parameter by the LPC cepstrum analysis is expressed in the same form as Eq. (3). Furthermore, a linear prediction coefficient $\{\alpha_1|i=1, \ldots, p\}$, a PARCOR coefficient $\{K_i|i=1, \ldots, p\}$ and a line spectrum pair LSP also represent spectral envelope information of speech signals. These spectral parameters are all expressed by a coefficient sequence (vector) and are called acoustic feature vectors. A description will be given typically of the LPC cepstrum $C=\{c_1, c_2, \ldots, c_K\}$, but any other spectral parameters can also be used.

As referred to previously herein, the principle of the present invention is to decide whether the period of the input signal is a speech period, depending on whether the frequency of spectrum variation of the input signal is within a predetermined range. The amount of change in the spectrum is obtained as a dynamic measure of speech as described below. The first step is to obtain a time sequence of acoustic parameter vectors of the speech signal by the FFT analysis, LPC analysis or some other spectrum analysis. Let it be assumed that a k-dimensional LPC cepstrum $C(t)=\{c_1, c_2, \ldots, c_K\}$ is used as the feature vector at time t. Next, to represent a change in the frequency spectrum of speech over a window width 2n (n being the number of discrete points in time) of a certain period, a local movement of the cepstrum C(t) is linearly approximated by a weighted least squares method and its inclination A(t) (a linear differential coefficient) is obtained as the amount of change in the spectrum (a gradient vector). That is, setting the weight $w_i=w_{-i}$, the inclination by the linear approximation is given by the following equation:

$$a_k(t) = \sum_{i=-n}^{n} i w_i c_k(t+i) / \sum_{i=-n}^{n} i^2 w_i \quad (4)$$

In the above, $a_k(t)$ represents a k-th element of a k-dimensional vector $A(t)=\{a_1(t), a_2(t), \ldots, a_k(t)\}$ which represents the dynamic feature of the spectrum at time t, and A(t) is referred to as a delta cepstrum. That is, $a_k(t)$ indicates a linear differential coefficient of a time sequence of k-dimensional cepstrum elements $c_k(t)$ at time t (see Furui, "Digital Speech Signal Processing," Tokai University Press).

The dynamic measure D(t) at time t is calculated by the following equation which represents the sum of squares of all elements of the delta cepstrum at time t (see Shigeki Sagayama and Fumitada Itakura, "On Individuality in a Dynamic Measure of Speech," Proc. Acoustical Society of Japan Spring Conf. 1979, 3-2-7, pp.589–590, June 1979).

$$D(t) = \sum_{k=1}^{K} a_k^2(t) \quad (5)$$

That is, the cepstrum C(k) represents the feature of the spectral envelope and the delta cepstrum, which is its linear differential coefficient, represents the dynamic feature. Hence, the dynamic measure represents the magnitude of the spectrum variation. The frequency SF of the spectrum variation is calculated as the number of peaks of the dynamic measures D(t) that exceed a predetermined threshold value $D_{th}$ during a certain frame period F (an analysis frame), or as the sum total (integral) of the dynamic measures D(t) in the analysis frame F.

While in the above the dynamic measure D(t) of the spectrum in the case of using the cepstrum C(t) has been described as the spectral feature (vector) parameter, the dynamic measure D(t) can be similarly defined as other spectral feature parameters which are represented by vector.

Speech contains two to three phonemes in 400 msec, for instance, and the spectrum varies corresponding to the number of phonemes. FIG. 1 is a graph showing the number of peaks indicating large spectrum variations in the unit time (400 msec, which is defined as the analysis frame length F) measured for many frames. Eight pieces of speech data by reading were used. In FIG. 1 the abscissa represents the number of times the spectrum variation exceeded a value 0.5 per frame and the ordinate the rate at which the respective numbers of peaks were counted. As is evident from FIG. 1, the number of peaks per frame is distributed from once to five times. Though differing with the threshold value used to determine peaks or the speech data used, this distribution is characteristic of speech sounds. Thus, when the spectrum of the input signal varies once to five times in the 400 msec period, it can be decided as a speech signal period. The variation in the spectrum (feature vector) represents the inclination of the time sequence C(t) of feature vectors at each point in time.

Figure 2:
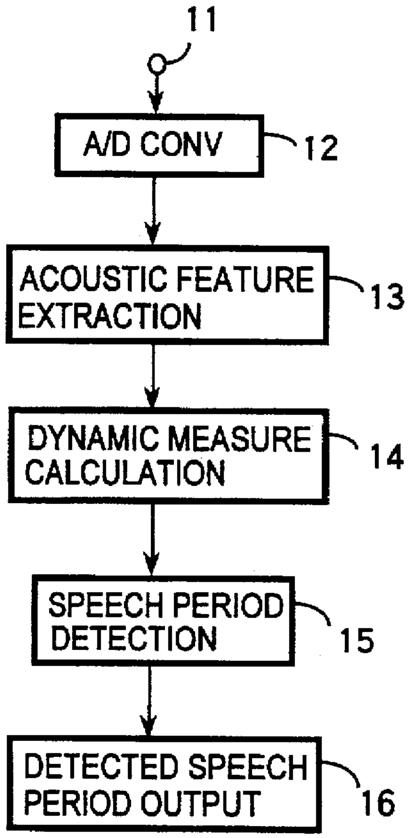
FIG. 2 is a diagram for explaining an embodiment of the present invention.
Figure 3:
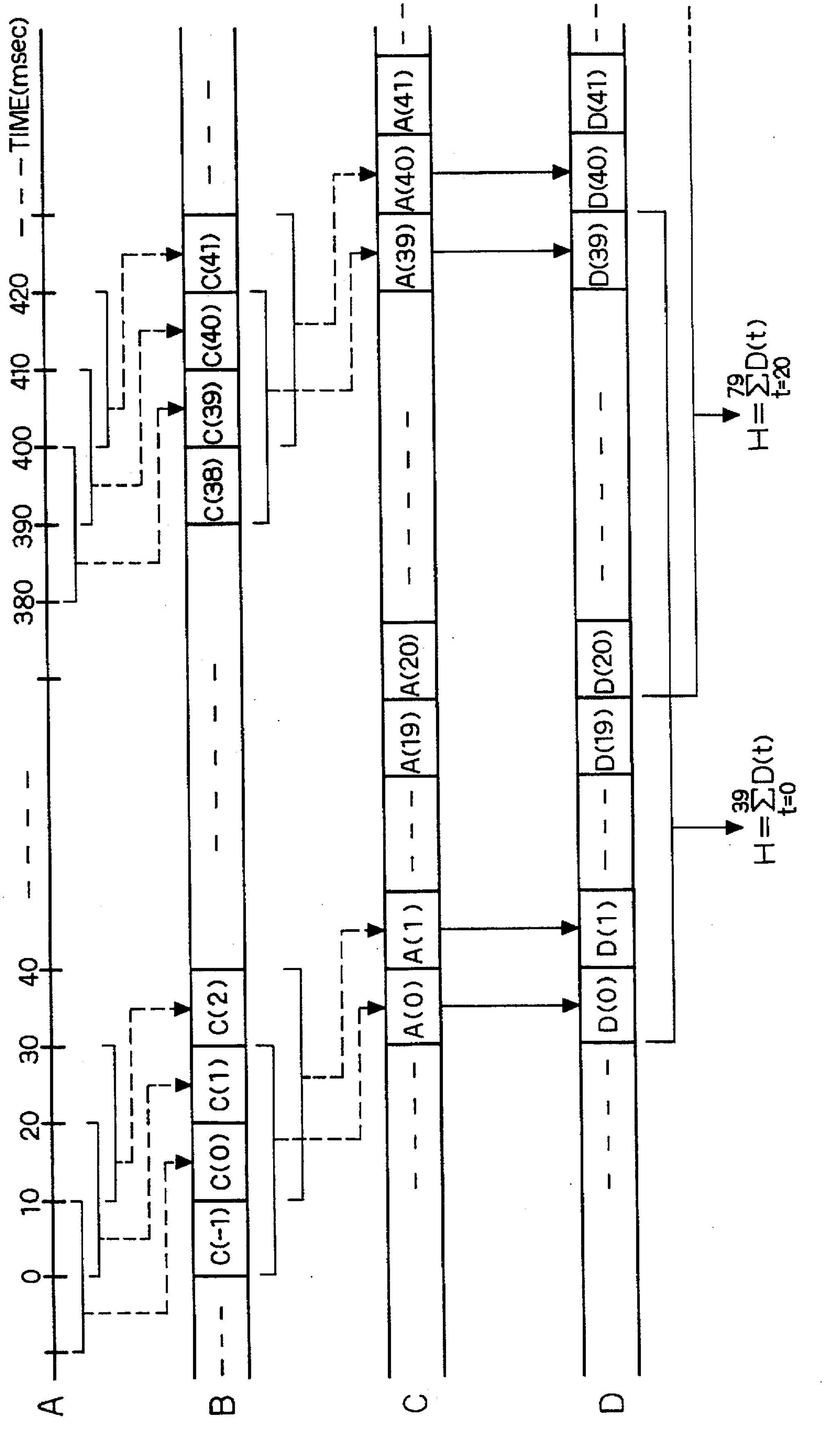
FIG. 3 is a timing chart of a spectrum analysis of a signal.

FIG. 2 illustrates an embodiment of the present invention. A signal S input via a signal input terminal 11 is converted by an A/D converting part 12 to a digital signal. An acoustic feature extracting part 13 calculates the acoustic feature of the converted digital signal, such as its LPC or FFT cepstrums. A dynamic measure calculating part 14 calculates the amount of change in the spectrum from the LPC cepstrum sequence. That is, the LPC cepstrum is obtained every 10 msec by performing the LPC analysis of the input signal for each analysis window of, for example, a 20 msec time width as shown on Row A in FIG. 3, by which a sequence of LPC cepstrums C(0), C(1), C(2), . . . is obtained as shown on row B in FIG. 3. Each time the LPC cepstrum C(t) is obtained, the delta cepstrum A(t) is calculated by Eq. (4) from 2n+1 latest LPC cepstrums as shown on Row C in FIG. 3. FIG. 3 shows the case where n=1. Next, each time the delta cepstrum A(t) is obtained, the dynamic measure D(t) is calculated by Eq. (5) as depicted on Row D in FIG. 3.

By performing the above-described processing over the analysis frame F of a 400 msec time length considered to contain a plurality of phonemes, 40 dynamic measures D(t) are obtained. A speech period detecting part 15 counts the number of peaks of those of the dynamic measures D(t) which exceed the threshold value $D_{th}$ and provides the count value as the frequency $S_F$ of the spectrum variation. Alternatively, the sum total of the dynamic measures D(t) over the analysis frame F is calculated and is defined as the frequency $S_F$ of the spectrum variation.

The frequency of spectrum variation in the speech period is precalculated, on the basis of which the upper and lower limit threshold values are predetermined. The frame of the input signal which falls in the range from the upper and lower limit threshold values is detected as a speech frame. Finally, the speech period detected result is output from a detected speech period output part 16. By repeatedly obtaining the frequency $S_F$ of spectrum variation during the application of the input signal while shifting the temporal position of the analysis frame F by a time interval of 20 msec each time, the speech period in the input signal is detected.

Figures 4, 5:
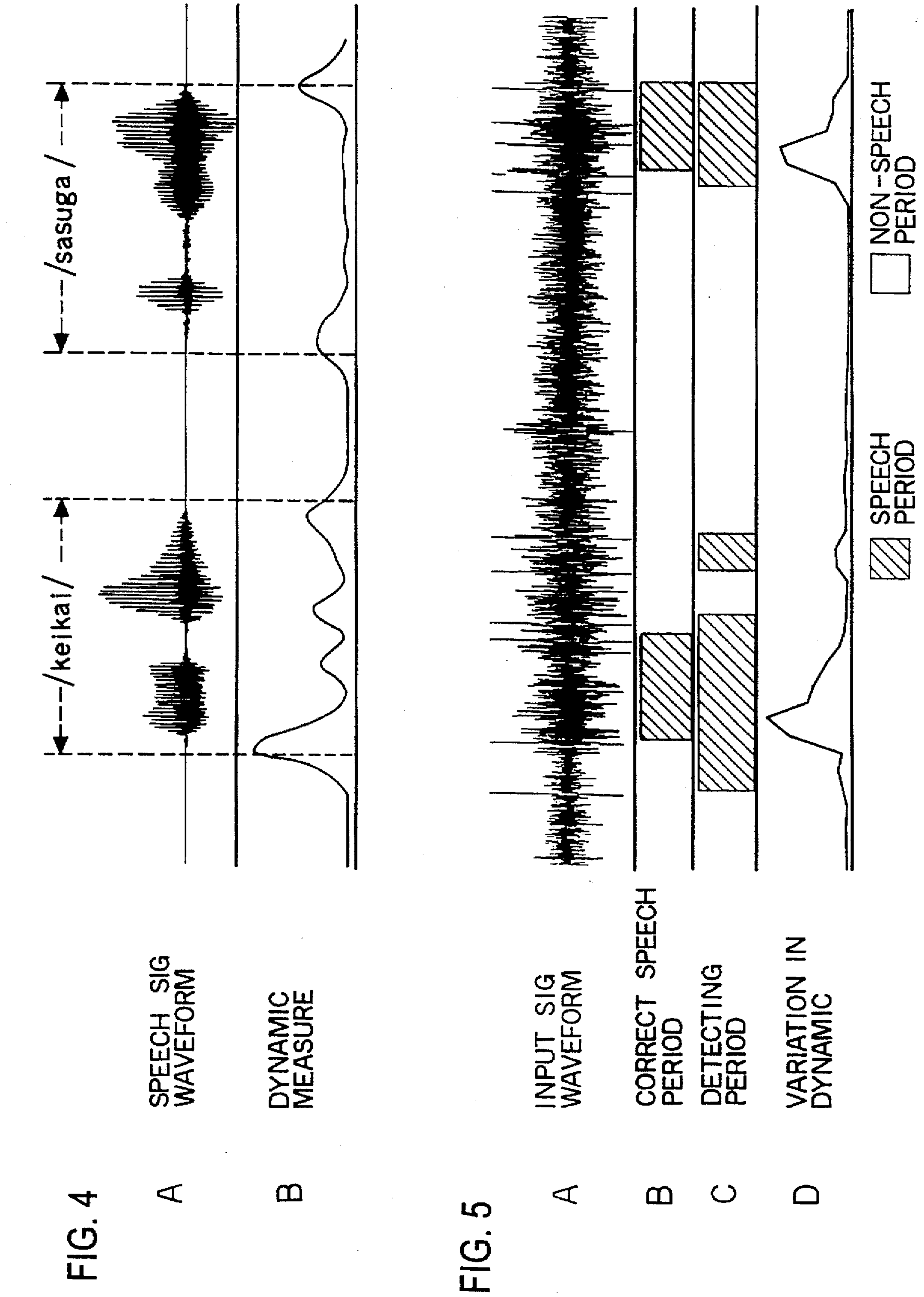
FIG. 4 is a diagram showing and speech signal waveforms and the corresponding variations in the dynamic measure in the FIG. 2 embodiment.
FIG. 5 is a diagram showing the results of speech detection in the FIG. 2 embodiment.

FIG. 4 is a diagram showing a speech signal waveform and an example of a pattern of the corresponding variation in the dynamic measure D(t). The speech waveform data shown on Row A is male speaker's utterances of Japanese words /keikai/ and /sasuga/ which means "alert" and "as might be expected," respectively. The LPC cepstrum analysis for obtaining the dynamic measure D(t) of the input signal was made using an analysis window 20 ms long shifting it by a 10 ms time interval. The delta cepstrum A(t) was calculated over a 100 ms frame width. It is seen from FIG. 4 that the dynamic measure D(t) does not much vary in a silent part of a stationary part of speech as shown on Row B and that peaks of dynamic measures appear at start and end points of the speech or at the boundary between phonemes.

FIG. 5 is a diagram for explaining an example of the result of detection of speech with noise superimposed thereon. The input signal waveform shown on Row A was prepared as follows: The noise of a moving car was superimposed, with a 0 dB SN ratio, on a signal obtained by concatenating two speakers' utterances of a Japanese word /aikawarazu/ which means "as usual," the utterances being separated by a 5 sec silent period. Row B in FIG. 5 shows a correct speech period representing the period over which speech is present, Row D shows variations in the dynamic measure D(t). Row C shows the speech period detected result automatically determined on the basis of variations in the dynamic measure D(t). The dynamic measure D(t) was obtained under the same conditions as in FIG. 4. Accordingly, the dynamic measure was obtained every 10 ms. The analysis frame length was 400 ms and the analysis frame was shifted in steps of 200 ms. The sum total of the dynamic measures D(t) in the analysis frame period was calculated as the frequency $S_F$ of the spectrum variation. In this example, the analysis frame F for which the value of this sum total exceeded a predetermined value 4.0 was detected as the speech period. While speech periods are not clearly seen on the input signal waveform because of low SN ratio, it can be seen that all speech periods were detected by the method of the present invention. FIG. 5 indicates that the present invention utilizes the frequency of the spectrum variation and hence permits detection of speech in noise.

Figures 6, 7:
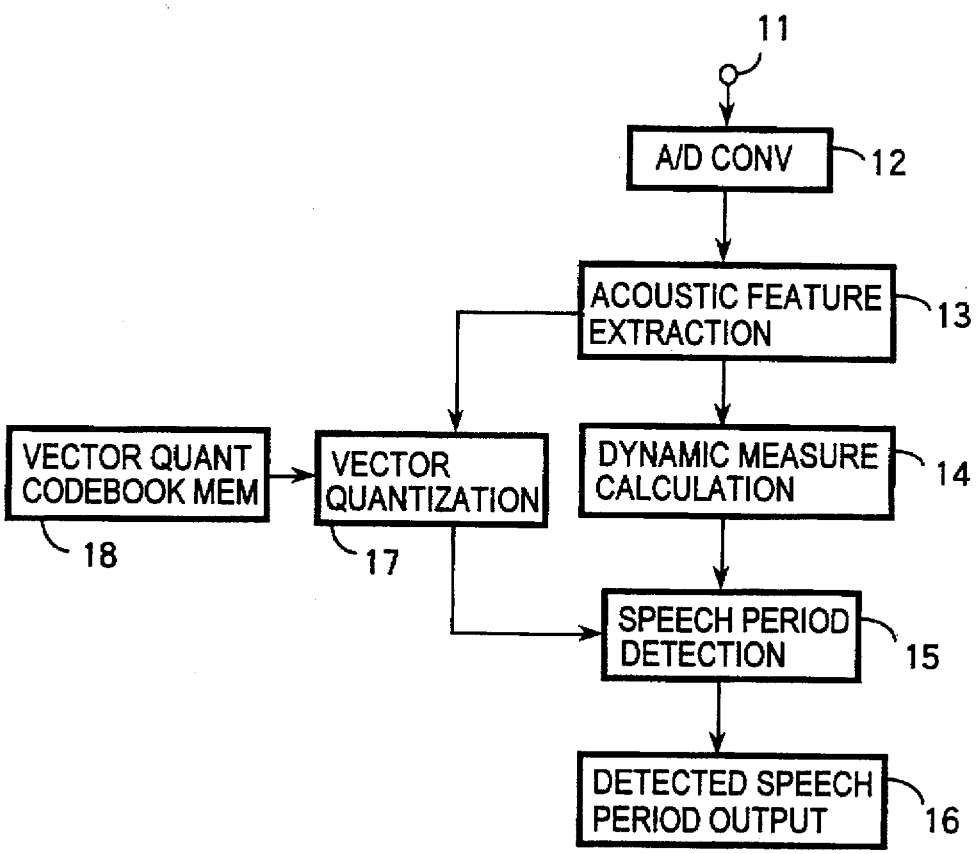
FIG. 6 is a diagram for explaining another embodiment of the present invention which combines the frequency of spectrum change with a vector quantization scheme.
FIG. 7 is a diagram showing the effectiveness of the FIG. 6 embodiment.

FIG. 6 is a diagram for explaining another embodiment of the present invention, which uses both of the dynamic measure and the spectral envelope information to detect the speech period. As is the case with the above-described embodiment, the signal input via the signal input terminal 11 is converted by the a/D converting part 13 to a digital signal. The acoustic feature extracting part 13 calculates, for the converted digital signal, the acoustic feature such as LPC or FFT cepstrum. The dynamic measure calculating part 14 calculates the dynamic measure D(t) on the basis of the acoustic feature. A vector quantizer 17 refers to a vector quantization code book memory 18, then sequentially reads out therefrom precalculated representative vectors of speech features and calculates vector quantization distortions between the representative vectors and feature vectors of the input signal to thereby detect the minimum quantization distortion. When the input signal in the analysis window is a speech signal, the acoustic feature vector obtained at that time can be vector quantized with a relatively small amount of distortion by referring to the code book of the vector quantization code book memory 18. However, if the input signal in the analysis window is not a speech signal, the vector quantization produces a large amount of distortion. Hence, by comparing the vector quantization distortion with a predetermined level of distortion, it is possible to decide whether the input signal in the analysis window is a speech signal or hot.

The speech period detecting part 15 decides that a signal over the 400 ms analysis frame period is a speech signal when the frequency $S_F$ of change in the dynamic measure falls in the range defined by the upper and lower limit threshold values and the quantization distortion between the feature vector of the input signal and the corresponding representative speech feature vector is smaller than a predetermined value. Although this embodiment uses the vector quantization distortion to examine the feature of the spectral enveloped it is also possible to use a time sequence of vector quantized codes to determine if it is a sequence characteristic of speech. Further, a method of obtaining a speech decision space in a spectral feature space may sometimes be employed, Now a description will be given of an example of an experiment which detects speech by a combination of the dynamic measure and the speech feature vector that minimizes the above-mentioned vector quantization distortion. This is an example of an experiment for detecting speech from an input signal composed of speech and the singing of a bird alternating with each other. In the experiment the vector quantization code book was prepared from a large quantity of speech data. As the speech data, 20 speakers' utterances of 50 words and 25 sentences were selected from an ATR speech database. The number of quantization points is 512. The feature vector is a 16-dimensional LPC cepstrum, the analysis window width is 30 ms and the window shift width 10 ms. The sum of quantization distortions of feature vectors provided every 10 ms was calculated using the 400 ms long analysis window shifted in steps of 200 ms. Similarly, the sum of dynamic measures was also calculated using the 400 ms long analysis window shifted in steps of 200 ms. For each of the dynamic measure and the quantization distortion, the range of their acceptable values in the speech period is preset based on learning speech and the speech period is detected when input speech falls in the range, The input signal used for evaluation was alternate concatenations of eight sentences each composed of speech about 5 sec long and eight kinds of birds' songs each 5 sec long, selected from a continuous speech database of the Acoustical Society of Japan. The following measures are set to evaluate the performance of this embodiment.

Frame detect rate=(the number of correctly detected speech frames)/(the number of speech frames in evaluation data)

Correct rate=(the number of correctly detected speech frames)/(the number of frames that the system output as speech)

The correct rate represents the extent to which the result indicated by the system as the speech frame is correct. The detect rate represents the extent to which the system could detect speech frames in the input signal. In FIG. 7 there are shown, using the above measures, the results of speech detection with respect to the evaluation data. The spectrum variation speed of the singing of birds bears a close resemblance to the spectrum variation speed of speech; hence, when only the dynamic measure is used, the singing of birds is so often erroneously detected as speech that the correct rate is low. With the combined use of the dynamic measure and the vector quantization distortion, the spectral envelope of the singing of birds can be distinguished from the spectral envelope of speech and the correct rate increases accordingly.

Incidentally, in the case of a long vowel such as a diphthong, the spectrum may sometimes undergo no variation in the vowel period. When speech contains such a vowel, there is a possibility of a detection error arising only with the method of the present invention which uses the spectrum variation. By combining this invention method with the detection of the pitch frequency, amplitude value or autocorrelation coefficient of the input signal heretofore utilized, it is possible to reduce the possibility that the detection error arises. The pitch frequency is the number of vibrations of the human vocal cords and ranges from 50 to 500 Hz and distinctly appears in the stationary part of the vowel. That is, the pitch frequency component usually has large amplitude (power) and the presence of the pitch frequency component means that the autocorrelation coefficient value in that period is large. Then, by detecting the start and end points and periodicity of the speech period through the detection of the frequency of the spectrum variation by this invention method and by detecting the vowel part with one or more of the pitch frequency, the amplitude and autocorrelation coefficient, it is possible to reduce the possibility of detection errors arising in the case of speech containing a long vowel.

Figure 8:
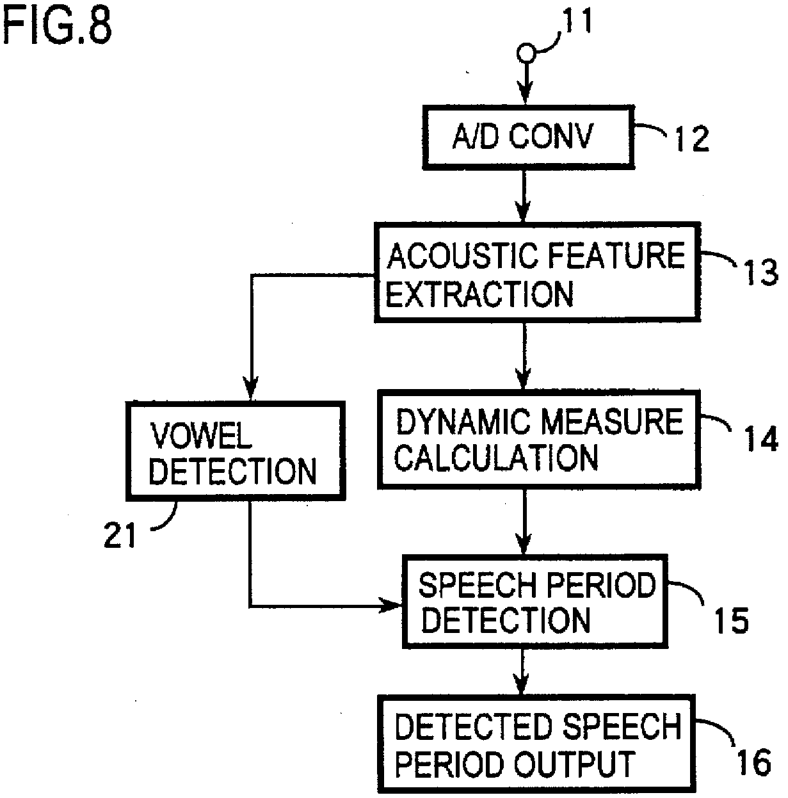
FIG. 8 is a diagram illustrating another embodiment of the present invention which combines the frequency of spectrum change with the pitch frequency of the input signal.

FIG. 8 illustrates another embodiment of the present invention which combines the FIG. 2 embodiment with the vowel detection scheme. No description will be given of steps 12 to 16 in FIG. 8 since they corresponds to those in FIG. 2. A vowel detecting part 21 detects the pitch frequency, for instance. The vowel detecting part 21 detects the pitch frequency in the input signal and provides it to the speech period detecting part 15. The speech period detecting part 15 determines if the frequency $S_F$ of the variation in the dynamic measure D(t) is in the predetermined threshold value range in the same manner as in the above and decides whether the pitch frequency is in the 50 to 500 Hz range typically of human speech. An input signal frame which satisfies these two conditions is detected as a speech frame. In FIG. 8 the vowel detecting part 21 is shown to be provided separately of the main processing steps 12 through 16, but since in practice the pitch frequency, spectral power or autocorrelation value can be obtained by calculation in step 13 in the course of cepstrum calculation, the vowel detecting part 21 need not always be provided separately. While in FIG. 8 the detection of the pitch frequency is shown to be used for the detection of the speech vowel period, it is also possible to calculate one or more of the pitch frequency, power and autocorrelation value and use them for the decision of the speech signal.

Figure 9:
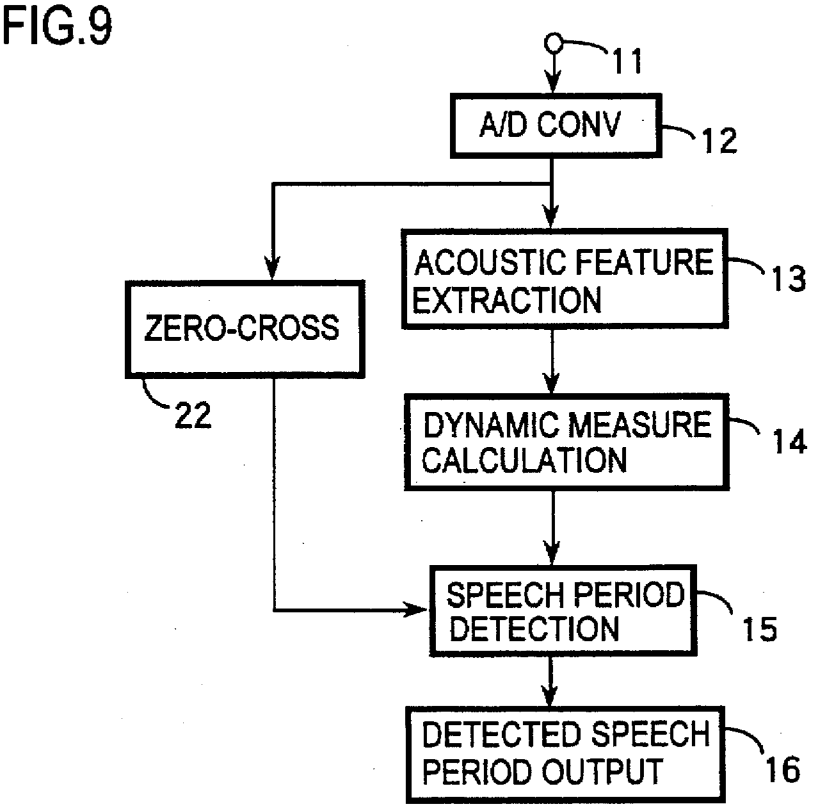
FIG. 9 is a diagram illustrating still another embodiment of the present invention which combines the frequency of spectrum change with the number of zero crossings of the input signal.

For the detection of the speech period, the detection of vowel shown in FIG. 8 may be substituted with the detection of a consonant. FIG. 9 shows a combination of the detection of the number of zero crossings and the detection of the frequency of spectrum variation. Unvoiced fricative sounds mostly have a distribution of 400 to 1400 zero crossings per second. Accordingly, it is also possible to employ a method which detects the start point of a consonant, using a proper aero crossing number threshold value selected by a zero crossing number detecting part 22 as shown in FIG. 9.

The speech period detecting method according to the present invention described above can be applied to a voice switch which turns ON and OFF an apparatus under voice control or the detection of speech periods for speech recognition. Further, this invention method is also applicable to speech retrieval which retrieves a speech part from video information or CD acoustic information data.

EFFECT OF THE INVENTION

As described above, according to the present invention, since the speech period is detected on the basis of the frequency of spectrum variation characteristic of human speech, only the speech period can stably be detected even from speech with noise of large power superimposed thereon. And noise of a power pattern similar to that of speech can also be distinguished as non-speech when the speed of its spectrum variation differs from the phoneme switching speed of speech. Therefore, the present invention can be applied to the detection of the speech period to be recognized in preprocessing when a speech recognition unit is used in a high-noise environment, or to the technique for retrieving a scene of conversations, for instance, from acoustic data of a TV program, movie or similar media which contains music or various sounds and for video editing or summarizing its contents. Moreover, the present invention permits detection of the speech period with higher accuracy by combining the frequency of spectrum variation with the power value, zero crossing number, autocorrelation coefficient or fundamental frequency which is another characteristic of speech.

It will be apparent that many modifications and variations may be effected without departing from the scope of the novel concepts of the present invention.

What is claimed is:

1. A signal processing method for detecting a speech period in an input signal, comprising the steps of:

(a) obtaining a spectral feature parameter by analyzing the spectrum of said input signal for each predetermined analysis window;

(b) calculating the amount of change in said spectral feature parameter of said input signal per unit time;

(c) calculating the frequency of variation in the amount of said spectral feature parameter over a predetermined analysis frame period longer than said unit time; and (d) making a check to see if said frequency of variation falls in a predetermined frequency range and, if so, deciding that said input signal of said analysis frame is a speech signal.

2. The method of claim 1, wherein said step of calculating the amount of change in said spectral feature parameter comprises a step of obtaining a time sequence of feature vectors representing the spectra of said input signal at respective points in time, and a step of calculating dynamic features through the use of said feature vectors at a plurality of points in time and calculating the variation in the spectrum of said input signal from the norm of said dynamic features.

3. The method of claim 2, wherein said dynamic feature are polynomial expansion coefficients of said feature vectors at a plurality of points in time.

4. The method of claim 1, 2, or 3, wherein said frequency calculating step is a step of counting the number of peaks of said spectrum variation exceeding a predetermined threshold value over said analysis frame and providing the count value as said frequency.

5. The method of claim 1, 2, or 3 wherein said frequency calculating step includes a step of calculating the sum total of variations in the spectrum of said input signal over said predetermined analysis frame period longer than said unit time and said deciding step decides that said input signal of said analysis frame period is a speech signal when said sum total falls in a predetermined range of values.

6. The method of claim 4, wherein said step of calculating said spectrum variation comprises a step of calculating a gradient vector using as its elements linear differential coefficients of respective elements of a vector representing said spectral feature parameter, and a step of calculating square-sums of said respective elements of said gradient vector as dynamic measures of said spectrum variation.

7. The method of claim 6, wherein said spectral feature parameter is an LPC cepstrum and said spectrum variation is a delta cepstrum.

8. The method of claim 1, further comprising a step of vector quantizing said input signal for each said analysis window by referring to a vector code book composed of representative vectors of spectral feature parameters of speech prepared from speech data and calculating quantization distortion; and wherein said deciding step decides that said input signal is a speech signal when said quantization distortion is smaller than a predetermined value and said frequency of variation is within said predetermined frequency range.

9. The method of claim 1, further comprising a step of detecting whether said input signal in said each analysis window is a vowel, and wherein said deciding step (d) said input signal is a speech signal when said detecting step detects a vowel and said frequency of variation is in said predetermined frequency range.

10. The method of claim 9, wherein said vowel detecting step detects a pitch frequency in said input signal for said each analysis window and decides that said input signal is a vowel when said detected pitch frequency is in a predetermined frequency range.

11. The method of claim 9, wherein said vowel detecting step detects the power of said input signal for said each analysis window and decides that said input signal is a vowel when said detected power is larger than a predetermined value.

12. The method of claim 9, wherein said vowel detecting step detects the autocorrelation value of said input signal and decides that said input signal is a vowel when said detected autocorrelation value is larger than a predetermined value.

13. The method of claim 1, further comprising a step (e) of counting the number of zero crossings of said input signal in said each analysis window and decides that said input signal in said analysis window is a consonant when said count value is within a predetermined range, and wherein said deciding step (d) decides that said input signal is a speech signal when said input signal is decided as a consonant by said deciding step (e) and said frequency of variation is in said predetermined frequency range.

14. The method of claim 1, 2, or 3, wherein said spectral feature parameter is an LPC cepstrum.

15. The method of claim 1, 2, or 3, wherein said spectral feature parameter is an FFT cepstrum.

16. The method of claim 5, wherein said step of calculating said spectrum variation comprises a step of calculating a gradient vector using as its elements linear differential coefficients of respective elements of a vector representing said spectral feature parameter, and a step of calculating square-sums of said respective elements of said gradient vector as dynamic measures of said spectrum variation.

17. The method of claim 16, wherein said spectral feature parameter is an LPC cepstrum and said spectrum variation is a delta cepstrum.

* * * * *